United States Patent
Krivopaltsev et al.

(10) Patent No.: US 10,089,523 B2
(45) Date of Patent: Oct. 2, 2018

(54) AUTOMATING CREATION OF ACCURATE OCR TRAINING DATA USING SPECIALIZED UI APPLICATION

(71) Applicant: INTUIT INC., Mountain View, CA (US)

(72) Inventors: Eugene Krivopaltsev, Mountain View, CA (US); Sreeneel K. Maddika, Mountain View, CA (US); Vijay S. Yellapragada, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 217 days.

(21) Appl. No.: 15/285,552

(22) Filed: Oct. 5, 2016

(65) Prior Publication Data

US 2018/0096200 A1   Apr. 5, 2018

(51) Int. Cl.
| | | |
|---|---|---|
| *G06K 9/00* | (2006.01) | |
| *G06K 9/46* | (2006.01) | |
| *G06K 9/52* | (2006.01) | |
| *G06K 9/62* | (2006.01) | |
| *G06T 7/00* | (2017.01) | |
| *G06T 7/60* | (2017.01) | |
| *G06T 11/60* | (2006.01) | |
| G06F 3/0481 | (2013.01) | |
| G06F 17/21 | (2006.01) | |

(52) U.S. Cl.
CPC ..... *G06K 9/00442* (2013.01); *G06K 9/00463* (2013.01); *G06K 9/4604* (2013.01); *G06K 9/52* (2013.01); *G06K 9/6256* (2013.01); *G06T 7/0042* (2013.01); *G06T 7/0085* (2013.01); *G06T 7/60* (2013.01); *G06T 11/60* (2013.01); G06F 3/0481 (2013.01); G06F 17/214 (2013.01); G06K 2209/01 (2013.01)

(58) Field of Classification Search
None
See application file for complete search history.

(56) References Cited

U.S. PATENT DOCUMENTS

| | | |
|---|---|---|
| 5,825,925 A | 10/1998 | Baird et al. |
| 8,761,513 B1 | 6/2014 | Rogowski et al. |
| 8,977,057 B1 | 3/2015 | Smith |
| 9,014,481 B1 | 4/2015 | Luqman et al. |
| 2011/0071665 A1 | 3/2011 | Brandt et al. |
| 2015/0363381 A1 | 12/2015 | Otaki |

OTHER PUBLICATIONS

International Search Report and Written Opinion dated Dec. 16, 2016 for Application No. PCT/US2016/056263.

*Primary Examiner* — Atiba O Fitzpatrick
(74) *Attorney, Agent, or Firm* — Patterson & Sheridan LLP (57) ABSTRACT

Systems of the present disclosure generate accurate training data for optical character recognition (OCR). Systems disclosed herein generates images of a text passage as displayed piecemeal in a user interface (UI) element rendered in a selected font type and size, determine accurate dimensions and locations of bounding boxes for each character pictured in the images, stitch together a training image by concatenating the images, and associate the training image, the bounding box dimensions and locations, and the text passage together in a collection of training data. The collection of training data also includes a computer-readable master copy of the text passage with newline characters inserted therein.

23 Claims, 10 Drawing Sheets

It was the best of times, it was the worst of times. βσ⁻Ωπ They seek him here, they seek him there, those Frenchies seek him everywhere. Let them eat cake. The quick brown fox jumped over the lazy dog. Oh, the humanity! To fear the foe, since fear oppresseth strength, Gives, in your weakness, strength unto your foe, And so your follies fight against yourself. Abandon all hope, ye who enter here. Poor fool, poor blind fool, I thought with sincere compassion, mugged by an invisible man! This feather may look worthless, but it comes from afar and carries with it all my good intentions. I think it is high time that Mr. Bunbury made up his mind whether he was going to live or to die. Pride relates more to our opinion of ourselves, vanity to what we would have others think of us. Mr. Tesla may accomplish great things, but he certainly will never do this. Cogito ergo sum. ¿ èλ €? ⁻≠ ΣμÆ ~*{- @# $%& ¢ ' " " ©<;" 20/ Si vis pacem, para bellum. Avast!

402

It was the best of times, it was the worst of times. βσ⁻Ωπ They seek him here, they seek him there, those Frenchies seek him everywhere. Let them eat cake. The quick brown fox jumped over the lazy dog. Oh, the humanity! To fear the foe, since fear oppresseth strength, Gives, in your weakness, strength unto your foe, And so your follies fight against yourself. Abandon all hope, ye who enter here. Poor fool, poor blind fool, I thought with sincere compassion, mugged by an invisible man! This feather may look worthless, but it comes from afar and carries with it all my good intentions. I think it is high time that Mr. Bunbury made up his mind whether he was going to live or to die. Pride relates more to our opinion of ourselves, vanity to what we would have others think of us. Mr. Tesla may accomplish great things, but he certainly will never do this. Cogito ergo sum. ¿ èλ €? ⁻≠ ΣμÆ ~*{- @# $%& ¢ ' " " ©<;" 20/ Si vis pacem, para bellum. Avast!

It was the best of times, it was the worst of times. βo⁻Ωn They seek him here, they seek him there, those Frenchies seek him everywhere. Let them eat cake. The quick brown fox jumped over the lazy dog. Oh, the humanity! To fear the foe, since fear oppresseth strength, Gives, in your weakness, strength unto your foe, And so your follies fight against yourself. Abandon all hope, ye who enter here. Poor fool, poor blind fool, I thought with sincere compassion, mugged by an invisible man! This feather may look worthless, but it comes from afar and carries with it all my good intentions. I think it is high time that Mr. Bunbury made up his mind whether he was going to live or to die. Pride relates more to our opinion of ourselves, vanity to what we would have others think of us. Mr. Tesla may accomplish great things, but he certainly will never do this. Cogito ergo sum. ¿ èλ €? ⁻⸗ ΣμÆ ⁻*(⁻ @# $%& ¢ '
" " ☺<;" 20/ Si vis pacem, para bellum. Avast!

404

It was the best of times, it was the worst of times. βo⁻Ωn They seek him here, they seek him there, those Frenchies seek him everywhere. Let them eat cake. The quick brown fox jumped over the lazy dog. Oh, the humanity! To fear the foe,

406 since fear oppresseth strength, Gives, in your weakness, strength unto your foe, And so your follies fight against yourself. Abandon all hope, ye who enter here. Poor fool, poor blind fool, I thought with sincere compassion, mugged by an

408 invisible man! This feather may look worthless, but it comes from afar and carries with it all my good intentions. I think it is high time that Mr. Bunbury made up his mind whether he was going to live or to die. Pride relates more to our opinion of

410 ourselves, vanity to what we would have others think of us. Mr. Tesla may accomplish great things, but he certainly will never do this. Cogito ergo sum. ¿ èλ €? ⁻⸗ ΣμÆ ⁻*(⁻ @# $%& ¢ '
" " ☺<;" 20/ Si vis pacem, para bellum. Avast!

AUTOMATING CREATION OF ACCURATE OCR TRAINING DATA USING SPECIALIZED UI APPLICATION

BACKGROUND

Field

The present disclosure generally relates to optical character recognition (OCR) systems. More specifically, the present disclosure provides techniques for generating training data for OCR systems.

Description of the Related Art

Optical character recognition (OCR) refers to software that converts images of text into a computer-readable form. Many OCR applications use machine-learning models which have been trained to recognize text using training data.

In general, people manually verify that the computer-readable text accurately represents the text shown in the image. Furthermore, people may also have to ensure that each bounding box properly bounds a single character found in the image. Since thousands of characters may appear in a single OCR-training image, the amount of time and manual labor needed to verify training data may be large. For this reason, the manual labor is often crowdsourced (e.g., using Completely Automated Public Turing tests to tell Computers and Humans Apart CAPTCHAs).

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

DETAILED DESCRIPTION

Embodiments presented herein provide techniques for generating training data for machine-learning models used by optical character recognition (OCR) applications. Software applying these techniques generates images of a body of text as displayed in a selected font type and size, defines accurate bounding boxes for each character in the images, stitches the images together to form a combined training image, and associates the combined training image, the bounding boxes, and the body of text together in a set of training data.

Conventional approaches for inferring bounding box locations and dimensions typically start with an image of text without any predetermined indication of where characters are located, how large the characters are, which characters are depicted in the image, or which font the characters are rendered in. As a result, conventional approaches try to infer locations and dimensions of bounding boxes using features of the image alone. However, bounding box dimensions can vary depending on the font type, the font size, and the character bounded. Furthermore, the contours of the whitespace that separates characters can also vary greatly. Edges between characters and backgrounds can also be ambiguous, especially in grayscale images. As a result, computer-vision schemes frequently struggle to infer accurate bounding boxes for individual characters based only on image features. For example, in certain fonts, conventional approaches often place a single bounding box around the characters "m" in a text image. Since an OCR application analyzing the image segment contained in the bounding box assumes that the bounding box contains a single character, "rn" is often mistaken for "m." Conventional approaches can also commit other errors, such as generating a bounding box that does not completely contain a single character.

Furthermore, conventional approaches for determining bounding boxes often perform poorly on images where text appears in new or unknown fonts. This is because a new or unknown font, by definition, portrays characters in a unique style that is measurably different from styles of known fonts. As a result, image features of text rendered in an unknown font may not conform to the feature patterns that conventional approaches have been tailored to recognize to identify bounding boxes. For example, a module that has been tailored to determine bounding boxes based on fonts in which capital letters are continuous blocks of non-white pixels may struggle with a font that does not have this feature (e.g., Algerian). Conventional approaches also struggle to identify accurate bounding boxes when text is localized within an image.

Conventional approaches for determining bounding boxes therefore introduce errors that humans have to correct before the bounding boxes can be fully trusted for use in OCR training data. If left uncorrected, erroneous bounding boxes result in flawed OCR training data. OCR models that are trained with flawed data, in turn, tend to achieve suboptimal accuracy.

Typically, thousands of pages of text are used to train an OCR model. Each scanned page, in turn, may include thousands of characters. As a result, even if a conventional approach for determining bounding boxes generates only one erroneous bounding box per 1,000 characters on average, there is likely to be at least one error per scanned page. As a result, a significant amount of manual inspection is needed to identify erroneous bounding boxes in a typical set of OCR training data.

By contrast, embodiments described herein determine accurate bounding boxes for characters in OCR training images without requiring any manual correction. Furthermore, embodiments described herein produce three associated artifacts for OCR training: an image, bounding boxes for characters in the image, and "golden" text that indicates the correct character bounded by each bounding box. With these three artifacts, the character-recognition accuracy an OCR model achieves can be readily determined by executing the OCR model on the image and comparing the resulting output to the "golden" text.

By relying on certain properties of user interface (UI) elements, embodiments described herein determine bounding boxes for an image of text without relying exclusively on image features. In one embodiment, a training data generator determines dimensions for a bounding box for each character that an OCR model is expected to recognize. To determine the dimensions of a bounding box for a given character, the training data generator displays the character in a user interface (UI) element using a specified font type and size. The training data generator captures an image of the character as displayed in the UI element. The image includes background pixels that surround the character in the element (e.g., pixels defining margins or padding). The dimensions of the image define the dimensions of a bounding box for the character relative to the font type and size. Optionally, the training data generator also determines offsets between the edge of the image and the edge of the character. These offsets define the position and dimensions of a tight bounding box (i.e., a bounding box without margins or padding) within the bounding box for the character. The training data generator stores the character, the dimensions, the offsets, the font type, and the font size in a scheme that will allow the training data generator to look up dimensions and offsets using the character, the font type, and the font size as input parameters.

Once dimensions are defined for bounding boxes (and offsets defining tight bounding boxes, if desired) for each character, the training data generator identifies a text passage to convert into OCR training data. Next, the training data generator determines how wide a multi-line user-interface (UI) element can be. The training data generator also determines points where the text passage would wrap (i.e., continue on a next line) if displayed in the multi-line UI element in the font type and size. The training data generator then inserts line breaks (i.e., newline or end-of-line characters) into the text passage at those points. The training data generator then determines how many lines of text in the font type and size can be displayed in the multi-line UI element at once. The training data generator divides the body of text into multi-line fragments. Each multi-line fragment contains, at most, as many lines of text as can be displayed in the multi-line UI element at once. This ensures that each multi-line fragment can be displayed without scrolling.

Next, for each multi-line fragment, the training data generator repeats the following process. In the multi-line UI element, the training data generator displays the multi-line fragment in the font type and size. The training data generator then captures an image of the multi-line fragment as displayed. The image of the multi-line fragment is a preliminary image that will eventually be incorporated into a multipage image. In addition, for each line of the multi-line fragment, the training data generator determines the locations and dimensions of bounding boxes for each character in the line using the following process. First, the training data generator displays the character and all characters that precede the character in the line together in a single-line user-interface (UI) element. The training data generator determines a first coordinate for a bounding box to contain the character by subtracting a width of the bounding box from the width of the single-line user-interface (UI) element. The training data generator determines the width of the bounding box by retrieving the stored dimensions associated with the character, the font type, and the font size. The training data generator also determines another coordinate for the padded bounding box based on a number of the line (e.g., the first line of the text passage may be line 1, the second line may be line 2, etc.). The coordinates define the location of bounding box for the character. Optionally, the training data generator can also determine the location and dimensions of a tight bounding box for the character using the stored offsets associated with the character, the font type, and the font size.

Once images of the multi-line fragments have been captured and the bounding boxes for the characters in the multi-line fragments have been defined, the training data generator stitches together a multipage image by concatenating the preliminary images in sequential order. The multipage image depicts the full text passage in the font type and the font size. The text passage (including the inserted newlines) serves as the master text (i.e., "golden" text) for the multipage image by providing the text included therein in a computer-readable format. The multipage image, the master text, and parameters defining the bounding boxes are stored in a set of OCR training data. The parameters for each bounding box are associated with the character in the master text that corresponds to the character bounded by the bounding box in the multipage image.

Figure 1:
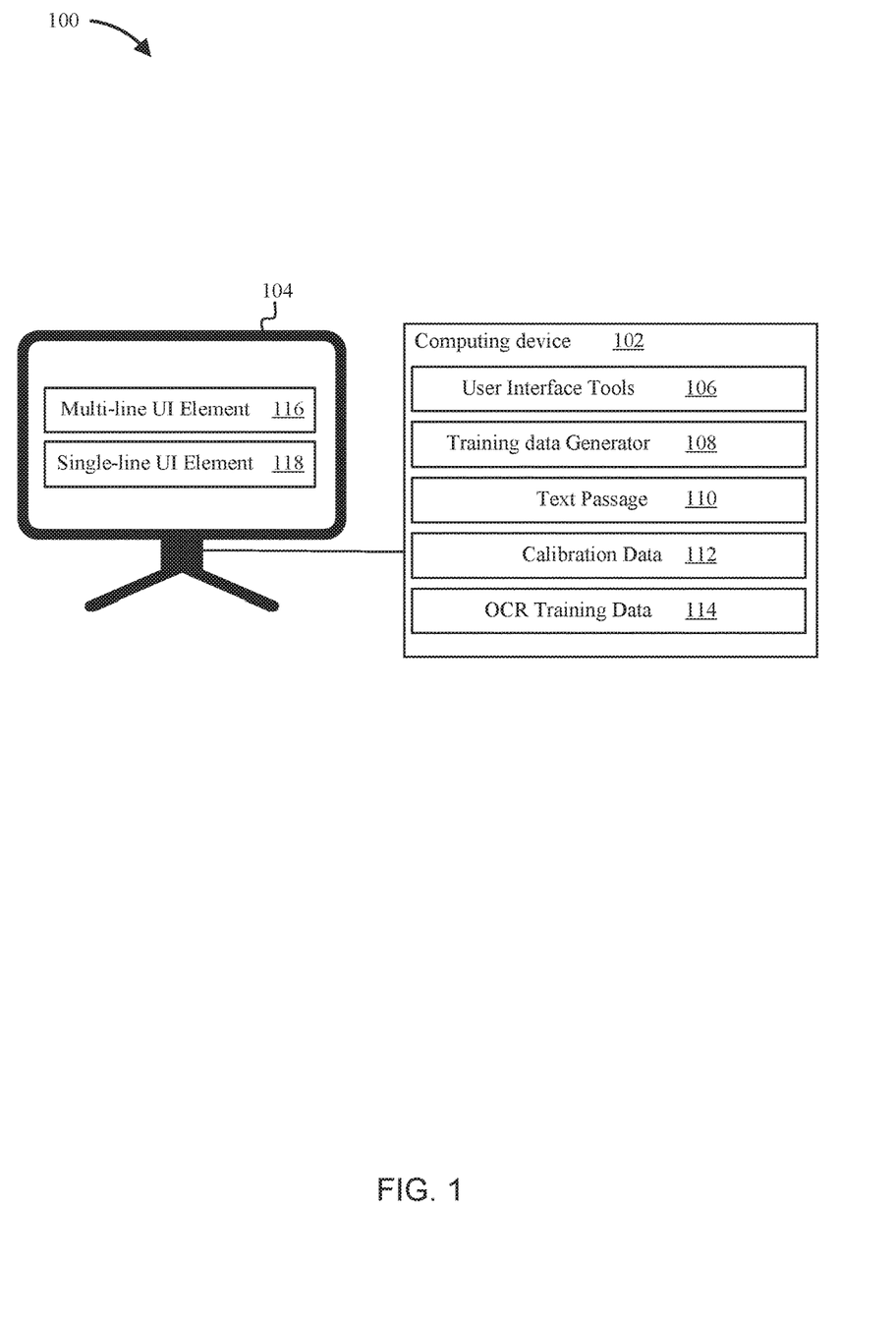
FIG. 1 illustrates a system for generating OCR training data, according to one embodiment.

FIG. 1 illustrates a system 100 for generating OCR training data, according to one embodiment. A training data generator 108 executes on a computing device 102. The training data generator 108 identifies a text passage 110 from which to create OCR training data 114. One example of training data for OCR includes an image of text, a representation of the text in a computer-readable format such as text file, and a list of bounding boxes for the image. Each bounding box may define an area of the image that depicts a single text character. Each bounding box in the training data is associated with a character in the computer-readable representation that corresponds to the text character the bounding box bounds in the image.

To create calibration data 112, the training data generator 108 displays each character in a set of characters for recognition individually on the display 104. More specifically, the training data generator 108 displays each character by itself in a user interface (UI) element (such as the single-line UI element 118). The term "UI element" refers to a programming construct used to show text on a screen, such as an object (e.g., a text box or text field) that is an instance of a UI element class defined in the user interface tools 106. The training data generator 108 captures an image of each character as displayed in a specified font type and font size (i.e., a character image). The dimensions of each image of a respective character define a bounding box (e.g., in pixels) for the character. The training data generator 108 stores the dimensions in the calibration data 112.

The training data generator 108 may insert newlines into the text passage 110 so that the text passage 110 can be shown in the multi-line UI element 116 in the font type and size without wrapping. If the text passage 110 has more lines than can be displayed in the multi-line UI element (rendered in the font type and size), the training data generator 108 divides the text into multi-line fragments. Each multi-line fragment fits in the multi-line UI element 116 without scrolling or wrapping. The training data generator 116 captures a preliminary image of each multi-line fragment as shown in the multi-line UI element 116 (in the font type and size).

For each line in a fragment of the text passage 110, the training data generator 108 determines a position of a bounding box for each character in the line. To do so, the training data generator 108 displays a subsequence of the line in the single-line UI element 118. The subsequence includes characters in the line up to the character for which the position is being calculated. However, the subsequence may not include characters in the line that follow the character for which the position is being calculated. The training data generator 108 calculates the width of the single-line UI element 118 used to display the subsequence. The training data generator 108 subtracts the width of a bounding box for the character from the width of the single-line UI element 118 used to display the subsequence. The result is a first coordinate for the bounding box of the character. The training data generator 108 also determines a second coordinate for the bounding box of the character based on the line number.

The training data generator 108 stitches together a multipage image by concatenating the preliminary images in sequential order. The training data generator 108 stores the multipage image and the text passage (as modified with the inserted newlines) into the OCR training data 114. The training data generator 108 also stores associated parameters defining the bounding boxes and specifying the font type and font size used.

Figure 2:
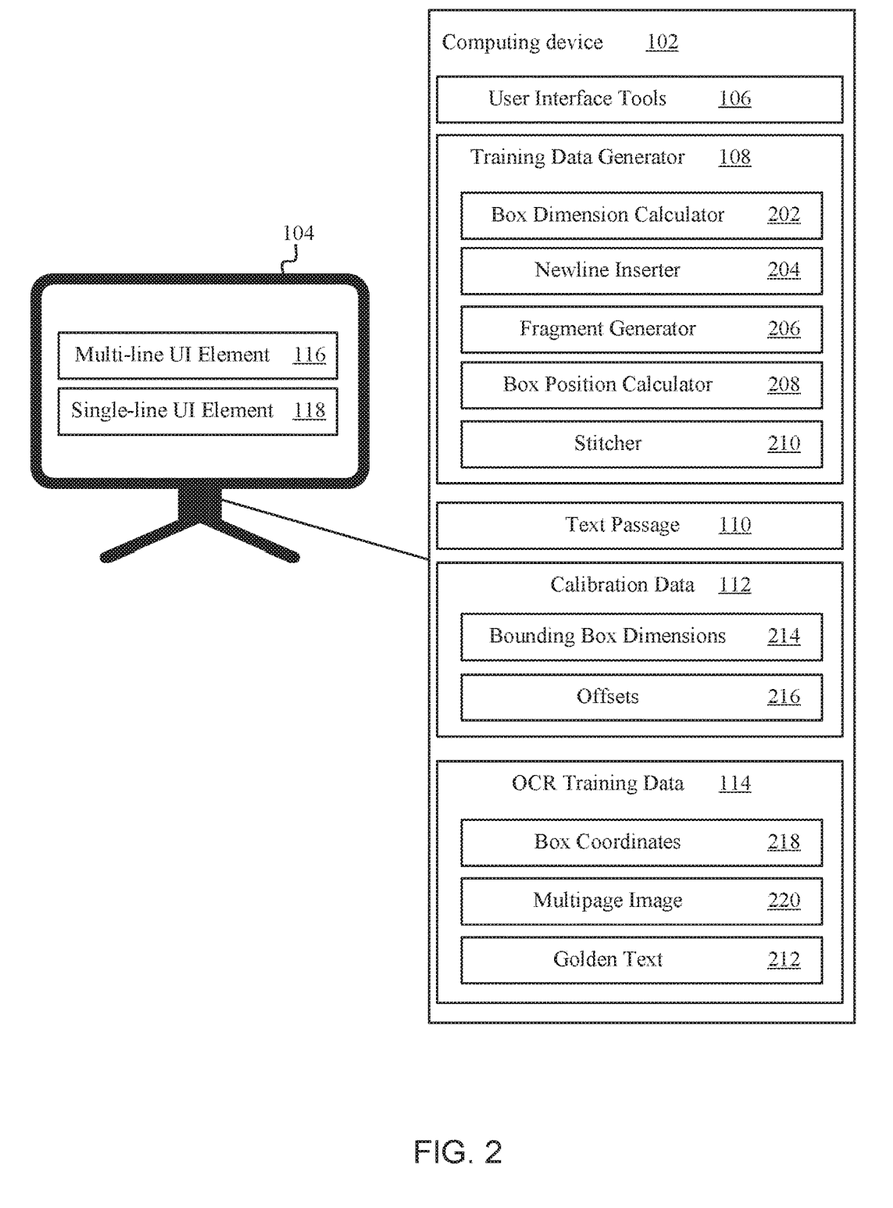
FIG. 2 illustrates a more detailed view of the system for generating OCR training data, according to one embodiment.

FIG. 2 illustrates a detailed view of the system 100, according to one embodiment. The training data generator 108 executes on the computing device 102. In one embodiment, the training data generator 108 identifies the text passage 110 to use to create OCR training data 114.

Calibration data 112 includes the dimensions of a bounding box for each type of character to be recognized. To create calibration data 112, the box dimension calculator 202 displays each character in a set of characters for recognition individually on the display 104. More specifically, the box dimension calculator 202 displays each character alone in a user interface (UI) element (such as the single-line UI element 118). Again, the term "UI element" refers to a programming construct used to show text on a screen, such as text box or another object that is an instance of a UI element class defined in the user interface tools 106.

The box dimension calculator 202 captures an image of each character as displayed in a specified font type and font size. The dimensions of each image of a respective character define a bounding box (e.g., width and height in pixels) for the character. The box dimension calculator 202 determines the dimensions of the images and stores them as the bounding box dimensions 214. The box dimension calculator 202 associates each bounding box dimension with the corresponding character and the font type and size used when the image of the character was captured. Optionally, the box dimension calculator 202 also determines offsets 216 for each character. An offset refers to a distance (e.g., measured in pixels) between an edge of an image and the character shown therein. The offsets define a tight bounding box.

The newline inserter 204 determines a maximum line width that multi-line UI element is configured to accommodate. Based on the line width, and based on the font size and type, the newline inserter 204 inserts newlines into the text passage 110 so that the text passage 110 can be shown in the multi-line UI element 116 in the font type and size without wrapping. The newline inserter 204 stores the text passage, as modified with the inserted newlines, as the golden text 212.

The fragment generator 206 determines a maximum height that the multi-line UI element 116 can accommodate. If the text passage 110 has more lines than can be displayed in the multi-line UI element at once (in the font type and size), the fragment generator 206 divides the text passage 110 into multi-line fragments. Each multi-line fragment can fit in the multi-line UI element 116 without scrolling or wrapping. Next, the fragment generator 206 displays each multi-line fragment in the multi-line UI element 116. The fragment generator 206 captures a preliminary image of each multi-line fragment as shown in the multi-line UI element 116 (in the font type and size).

In one embodiment, for each line of a multi-line fragment of the text passage 110, the box position calculator 208 determines a position of a bounding box for each character in the line. To do so, the box position calculator 208 displays a subsequence of the line in the single-line UI element 118. The subsequence includes all characters in the line up to the character, inclusive, for which the position is being calculated. However, the subsequence does not include characters in the line that follow the character for which the position is being calculated. The box position calculator 208 calculates the width of the single-line UI element 118 when the subsequence is displayed therein. The box position calculator 208 retrieves a width of a bounding box for the character from the bounding box dimensions 214. The box position calculator 208 subtracts the width of the bounding box for the character from the width of the single-line UI element 118. The result is a first coordinate for the bounding box of the character. The box position calculator 208 also determines a second coordinate for the bounding box of the character based on the line number. The box position calculator 208 stores the first and second coordinate in the box coordinates 218 along with associated parameters that define the bounding boxes and specify the font type and size.

The stitcher 210 stitches together the multipage image 220 by concatenating the preliminary images in sequential order. The stitcher 210 stores the multipage image in the OCR training data 114.

Figure 3:
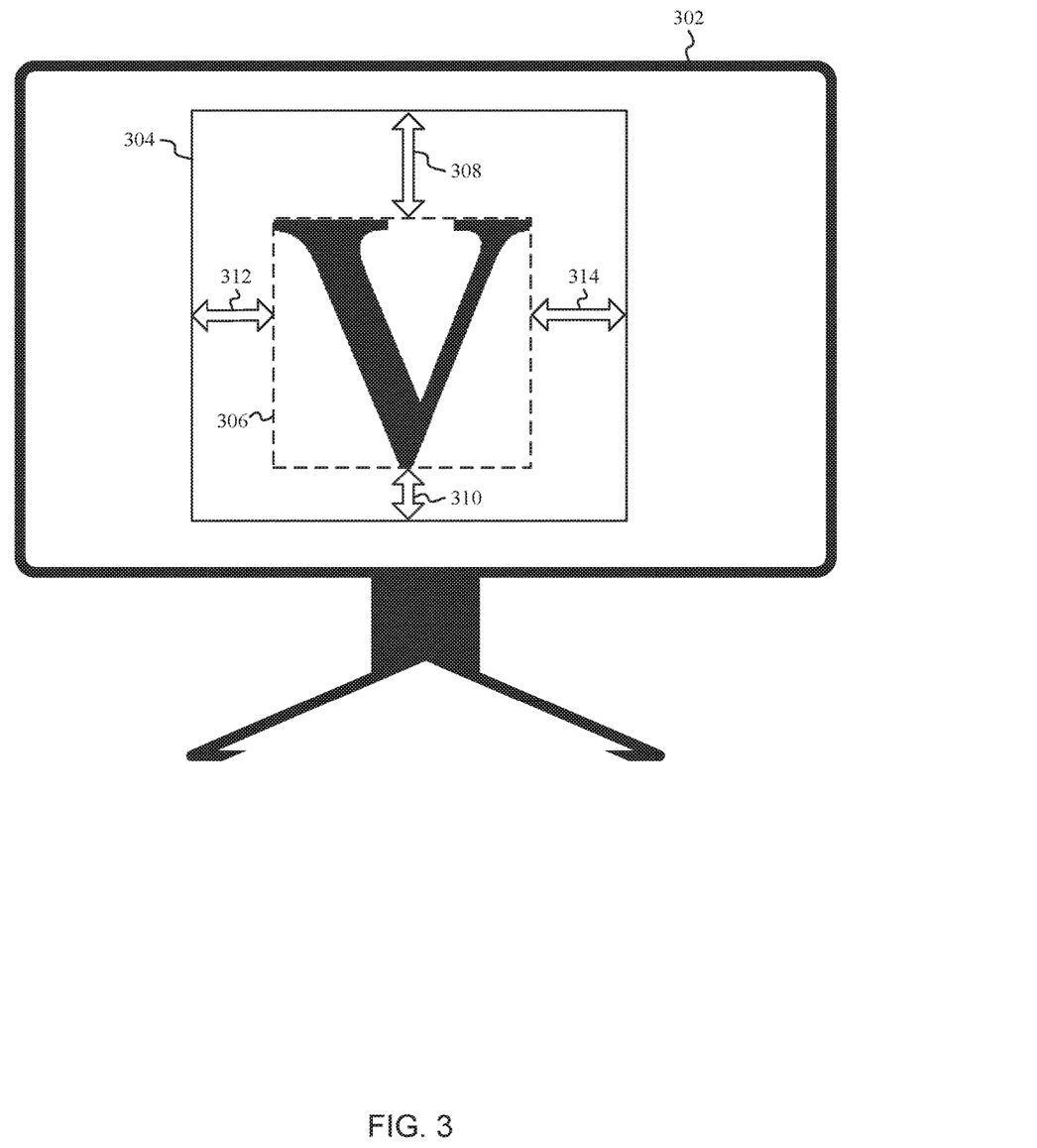
FIG. 3 illustrates an example screen shot that occurs when a training data generator calculates dimensions of a bounding box, according to one embodiment.

FIG. 3 illustrates an example screen shot that occurs when a training data generator calculates dimensions of a bounding box, according to one embodiment. The training data generator displays a character "v" on the display 302 in a UI element 304 in a preselected font type and size. The training data generator captures an image of the character "v" as displayed in the UI element 304. The training data generator determines the dimensions of the image (e.g., width and height in pixels). The training data generator associates the dimension with the character "v" and the font type and font size. The training data generator stores the dimensions for later access.

The dimensions of the image define a bounding box that contains the character "v" and the margins surrounding "v" in the UI element 304. Optionally, the training data generator may also determine offsets from the edges of the image that define a "tight" bounding box around "v" within the bounding box. For example, the training data generator may calculate a top offset 308, a bottom offset 310, a left offset 312, and a right offset 314. The training data generator stores the offsets along with the dimensions for later access.

Figure 4A:
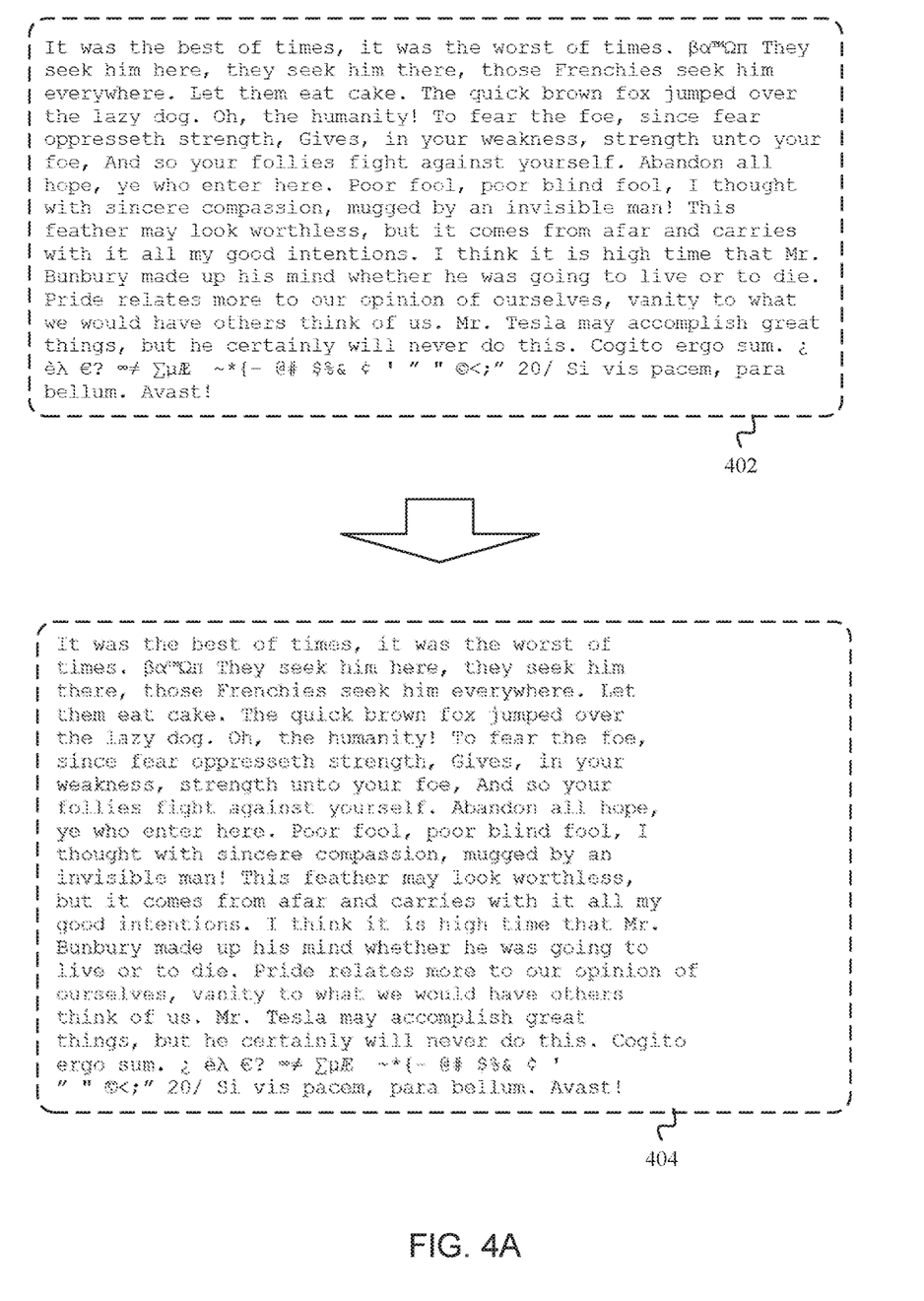
FIG. 4A illustrates a text passage before and after newlines are inserted, according to one embodiment.

FIG. 4A illustrates a text passage before and after newlines are inserted, according to one embodiment. A training data generator may detect that the text passage 402 is too wide for display in a multi-line UI element in a preselected font type and font size. The training data generator identifies where line wrapping would occur if the text passage were displayed in the multi-line UI element in the preselected font type and font size. The training data generator then inserts newline characters into the text passage, resulting in the modified text passage 404. The training data generator stores the text passage 404 as "golden" text (i.e., a computer-readable master version of the exact text that will be depicted in an associated multipage image).

Figure 4B:
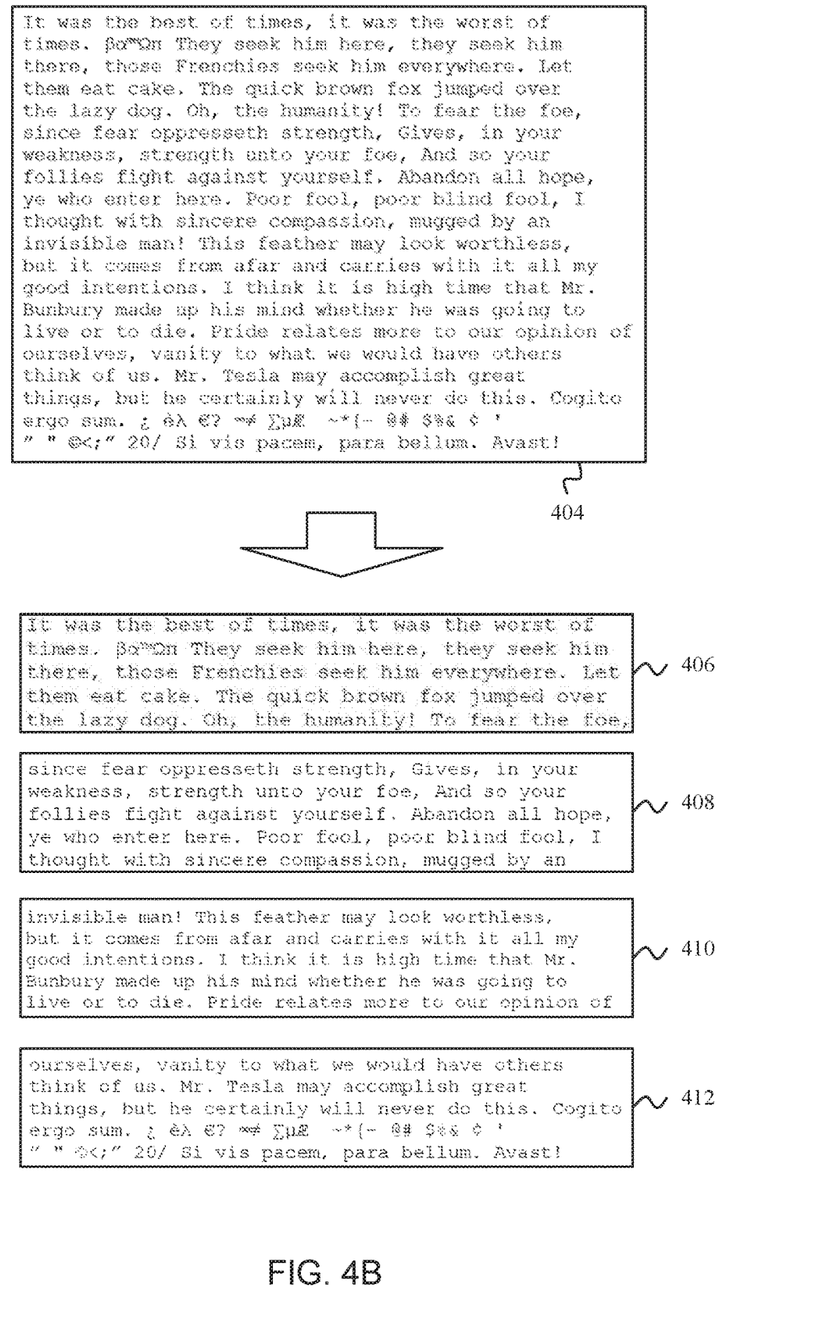
FIG. 4B illustrates the text passage being divided into multi-line fragments, according to one embodiment.

FIG. 4B illustrates the text passage 404 being divided into multi-line fragments, according to one embodiment. A training data generator may detect that not all lines of the text passage can be displayed at once in the multi-line UI element in the font type and size. The training data generator determines how many lines of text can be shown in the multi-line UI element in the font type and size. Next, the training data divides the text passage 404 into fragment 406, fragment 408, fragment 410, and fragment 412.

In this example, there are five lines per fragment. However, it should be understood that the number of lines per fragment varies based on how the height of characters in the font size compares to the height of the multi-line UI element. A small font size may result in many more lines per fragment, while a very large font size may result in as few as one line per fragment.

Figure 5:
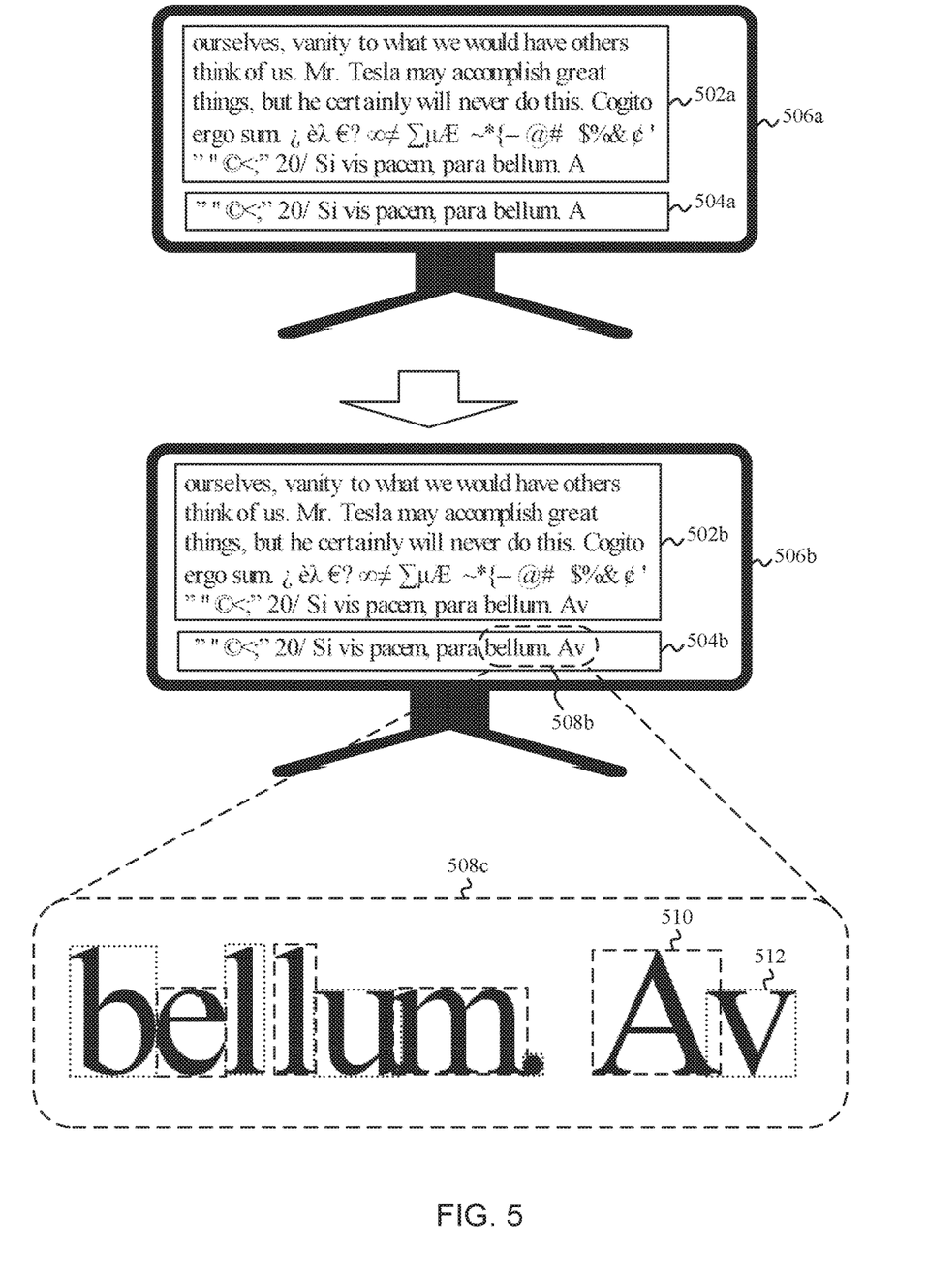
FIG. 5 illustrates successive screen shots that occur as a training data generator determines a bounding box position, according to one embodiment.

FIG. 5 illustrates successive screen shots that occur as a training data generator determines a bounding box position, according to one embodiment. The multi-line UI element 502a and the single-line UI element 504a illustrate what is shown on the display 506a in a screen shot shortly before the training generator calculates a coordinate of the bounding box for the character "v" in the last line of the multi-line fragment shown in multi-line UI element 502a. The text in both the multi-line UI element 502a and the single-line UI element 504a is rendered in a preselected font type and font size. As shown, all characters that precede "v" in the last line are displayed in the single-line UI element 504a.

The multi-line UI element 502b and the single-line UI element 504b illustrate what is shown on the display 506b in the next shot. All characters up to and including "v" in the last line are displayed in the single-line UI element 504b. The text in both the multi-line UI element 502b and the single-line UI element 504b is rendered in the preselected font type and font size. The training generator calculates the width of the single-line UI element 504b in this second screen shot.

The training generator then retrieves a width of a bounding box for "v" as displayed in the font type and size. The training generator determined the width of the bounding box beforehand by capturing an image of "v" alone in a UI element and calculating the image dimensions (e.g., as described for FIG. 3).

The width of the single-line UI element depends on the character subsequence displayed in the single-line UI element. Since single-line element 504b includes the additional character "v," single-line UI element 504b is wider than single-line UI element 504a. However, the width difference between single-line UI element 504b and single-line UI element 504a may be less than the width of the bounding box for "v" because of kerning (e.g., when space between characters is adjusted in a proportional font). To illustrate how kerning can cause this issue, selection 508c shows an enlarged view of the end of the character subsequence shown in single-line UI element 504b. As shown, bounding box 510 for "A" and bounding box 512 for "v" overlap. Because of this overlap, the difference between the widths of single-line UI element 504a, 504b is less than the width of bounding box 512.

The training generator uses single-line UE element 504b to calculate the width rather than multi-line UI element 502b because, in the screen shot shown, the width of multi-line element 502b does not reflect the width of the last line. Rather, the width of multi-line element 502b reflects the width of the widest line currently displayed in the multi-line element 502b.

In this example, text shown is left justified so that the width single-line element 504b is different from the width of single-line element 504a. To ensure that character spacing and positioning does not change as additional characters from the last line are appended to the text shown in single-line element 504b, the text should not be full justified. In addition, the justification scheme used for single-line element 504b should also be used for multi-line UI element 502b.

Figure 6:
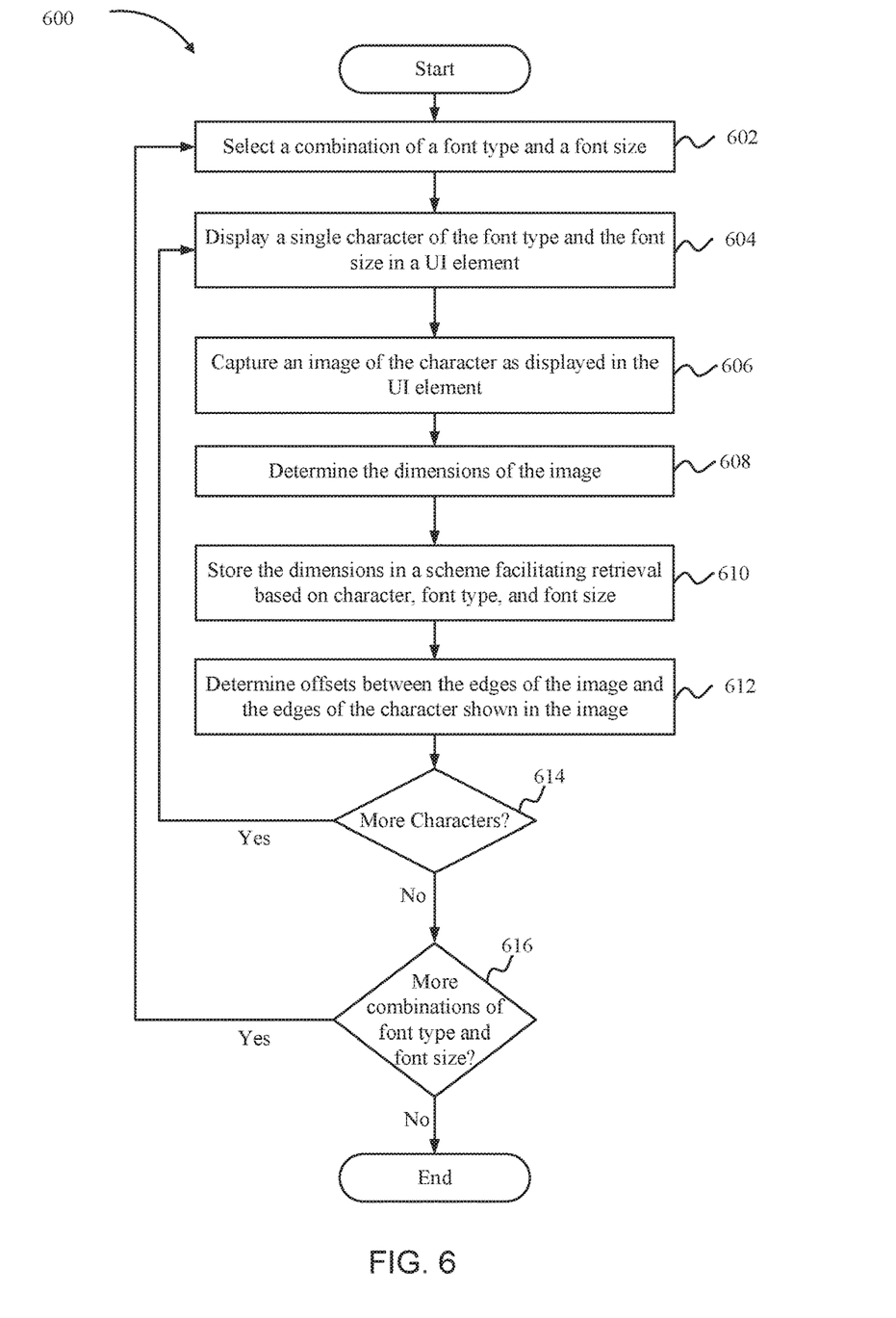
FIG. 6 illustrates a process for determining bounding box dimensions for a set of characters, according to one embodiment.

FIG. 6 illustrates a process 600 for determining bounding box dimensions for a set of characters, according to one embodiment. At step 602, a box dimension calculator selects a combination of a font type and a font size.

At step 604, the box dimension calculator displays a single character from the set in a UI element in the font type and size. At step 606, the box dimension calculator captures an image of the character as displayed in the UI element. At step 608, the box dimension calculator determines the dimensions of the image, including the image width and the image height. The dimensions of the image serve as bounding box dimensions for the character for the font type and size.

At step 610, the box dimension calculator stores the dimensions of the image in a scheme that allows the dimensions to be retrieved based on the character, the font type, and font size. The scheme may be implemented with a data structure, a flat file, a database, or some other construct used for data storage.

At step 612, the box dimension calculator determines offsets between the edges of the image and the character shown in the image. In one example, the box dimension calculator determines a left offset, a right offset, a top offset, and a bottom offset. Each offset may be measured in pixels. In this example, if the image shows the character against a white background, a left offset refers to the number of white pixels between the left edge of the image and the left edge of the character (e.g., the non-white pixel closest to the left edge of the image). Similarly, the top, bottom, and right offsets refer to the number of white pixels between the respective edges of the image and the respective edges of the character. When paired with the dimensions, the offsets define a "tight" bounding box for the character.

At step 614, the box dimension calculator determines whether there are any additional characters in the set for which dimensions have not yet been calculated. If there are, the box dimension calculator repeats steps 604-612 with the next character in the set. Otherwise, the box dimension calculator proceeds to step 616. At step 616, the box dimension calculator determines whether there are any more combinations of font type and font size for which bounding-box dimensions have not been determined for the characters in the set. If there are, the box dimension calculator repeats steps 602-614 with the next combination of font type and font size. Otherwise, the process 600 terminates.

In one embodiment, step 616 is applied as part of a batch mode of a training data generator that includes the box dimension calculator. In the batch mode, a user selects a set of font types and a set of font sizes. The box dimension calculator repeats steps 604-612 for each combination of font type and font size so that the user does not have to enter each combination manually.

Figure 7:
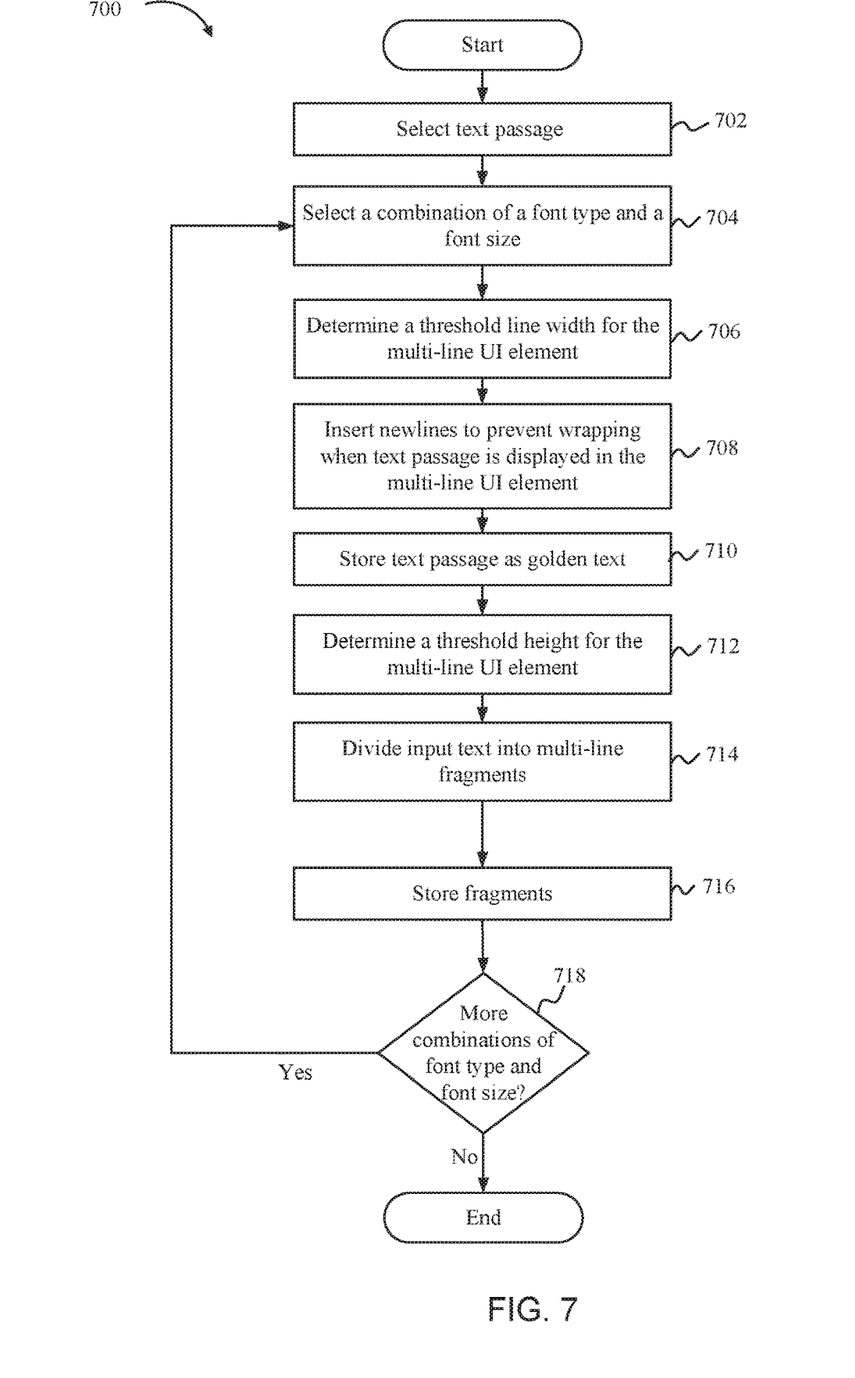
FIG. 7 illustrates a process for dividing a text passage into fragments, according to one embodiment.

FIG. 7 illustrates a process 700 for dividing a text passage into fragments, according to one embodiment. At step 702, a training data generator selects a text passage from which to create OCR training data. At step 704, the training data generator selects a combination of a font type and a font size.

At step 706, a newline inserter determines a threshold line width that a multi-line UI element is configured to accommodate. At step 708, based on the threshold line width, the font size, and the font type, the newline inserter adds newline characters into the text passage so that the text passage can be shown in the multi-line UI element in the font type and size without wrapping. In other words, after the newline characters have been inserted, no line of the text passage will exceed the threshold line width when rendered in the font type and font size. At step 710, the training data generator stores the text passage, as modified with the inserted newline characters, as master text (i.e., "golden" text) for later reference.

At step 712, a fragment generator determines a threshold height that the multi-line UI element is configured to accommodate. At step 714, the fragment generator divides the text passage into multi-line fragments so that each multi-line fragment can fit in the multi-line UI element without scrolling. In other words, each multi-line fragment, when rendered in the font type and the font size, will have a height not exceeding the threshold height. At step 716, the training data generator stores the multi-line fragments for later reference.

At step 718, the training data generator determines whether there are any additional combinations of font type and font size to consider. If so, the training data generator repeats steps 704-716 using the next combination. Otherwise, the process 700 ends.

In one embodiment, step 718 is applied as part of a batch mode of the training data generator. In the batch mode, a user selects a set of font types for which training data is to be generated. In one example, the set of font types may be {Times New Roman, Arial, Courier New, Oxford}, though other sets of fonts are possible. Generally, if there are N fonts available, the total number of possible sets of font types is:

$$\sum_{i=1}^{N} \binom{N}{i}$$

where i is an index variable ranging from 1 to N and ( ) is the "choose" function. The user may also select a font size range for which training data is to be generated, including starting size, an ending size, and a step size (i.e., discrete increment amount). For example, if the starting size is 12 point, the ending size is 20 point, and the step size is 2 point, the set of font sizes is {12, 14, 16, 18, 20}. (In this context, the term "point" refers to the typography unit used to measure font size). More formally, if the starting size is represented by S, the ending size is represented by E, and the step size is represented by P, the set of font sizes includes $$\frac{E-S}{P}$$

font sizes. The training data generator receives an indication of the set of font sizes and the font size range and repeats steps 704-716 for each combination of font type and font size. In this example, the total number of combinations of font type and font size in this example is $$N \cdot \frac{E-S}{P}.$$

The batch mode of the training data generator allows the user to specify the set of font types and the set of font sizes so that the user does not have to enter each combination manually.

Figure 8:
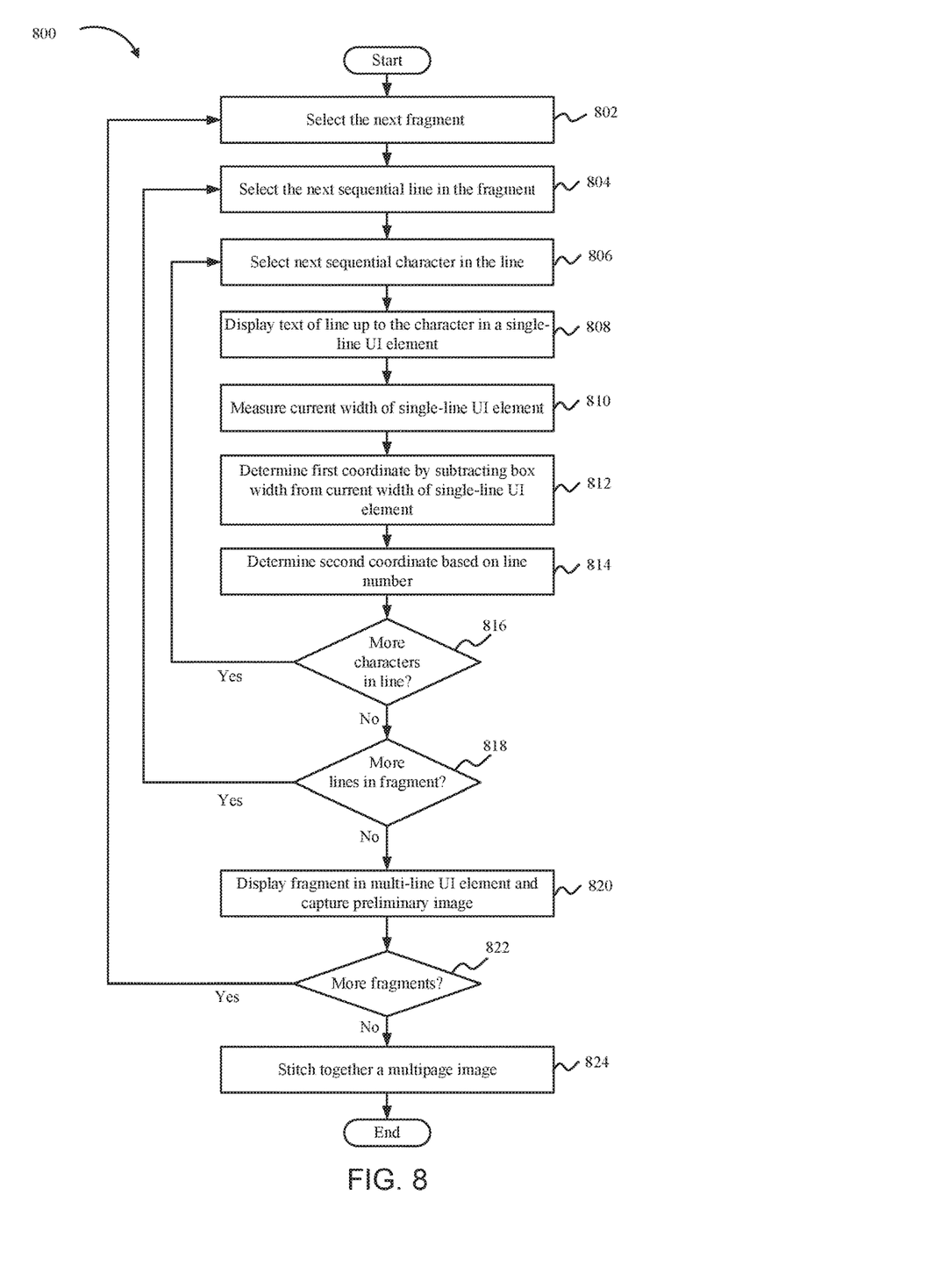
FIG. 8 illustrates a process for generating training data for OCR, according to one embodiment.

FIG. 8 illustrates a process for generating training data for OCR, according to one embodiment. At step 802, a training data generator selects a multi-line fragment excerpted from a text passage. The multi-line fragment, when rendered in a specific font type and size, will fit completely into a multi-line UI element of a predefined size.

At step 804, the training data generator selects the next sequential line in the multi-line fragment. At step 806, the training data generator selects the next sequential character in the selected line. At step 808, the training data generator displays the text of the selected line up to the selected character in a single-line UI element. In other words, the single-line UI element displays a truncated version of the selected line that ends at the selected character.

At step 810, the training data generator measures the current width of the single-line UI element. At step 812, the training data generator determines a first coordinate for a bounding box for the selected character by subtracting the width of the bounding box from the width of the single-line UI element. The width of the bounding box was determined beforehand by capturing an image of the selected character alone in a UI element and calculating the image dimensions (e.g., as described for FIG. 3).

At step 814, the training data generator determines a second coordinate for the bounding box for the selected character based on a line number of the selected line. For example, the training data generator may determine a line number from the text passage (from which the multi-line fragment was excerpted) that corresponds to the selected line. The training data generator may multiply the line number by the height of the bounding box (e.g., as measured in pixels) to determine the second coordinate.

At step 816, the training data generator determines whether there are any characters following the selected character in the selected line. If so, the training data generator repeats steps 806-814 with the next character in the line. Otherwise, the training data generator proceeds to step 818. At step 818, the training data generator determines whether there are any lines in the multi-line fragment following the selected line. If there are, the training data generator repeats steps 804-816 with the next line. Otherwise, the training data generator proceeds to step 820.

At step 820, the training data generator displays the complete multi-line fragment, rendered in the font type and font size, in a multi-line UI element. The training data generator captures a preliminary image of the multi-line fragment as displayed.

At step 822, the training data generator determines whether there are any fragments following the multi-line fragment in the text passage. If so, the training data generator repeats steps 802-820 for the next fragment. Otherwise, the training data generator proceeds to step 824.

At step 824, the training data generator stitches together a multipage image by concatenating the preliminary images in order. The multipage image depicts the text passage in the font type and font size. The training data generator stores the multipage image, the coordinates and dimensions of the bounding boxes, a master copy of the text passage in a computer-readable format, and optional indicators of the font type and font size together as a set of OCR training data. The set of OCR training data can then be used to train a machine-learning model for OCR.

In one embodiment, the set of OCR training data comprises a triplet that specifies the multipage image, the bounding boxes, and the "golden" (i.e., master) text. Indicators of the font type and font size may be stored as metadata associated with the multipage image.

In one embodiment, steps 802-824 are applied for multiple combinations of font types and sizes as part of a batch mode of the training data generator. In the batch mode, a user selects a set of font types and a set of font sizes. The box dimension calculator repeats steps 802-824 for each combination of font type and font size so that the user does not have to enter each combination manually.

Figure 9:
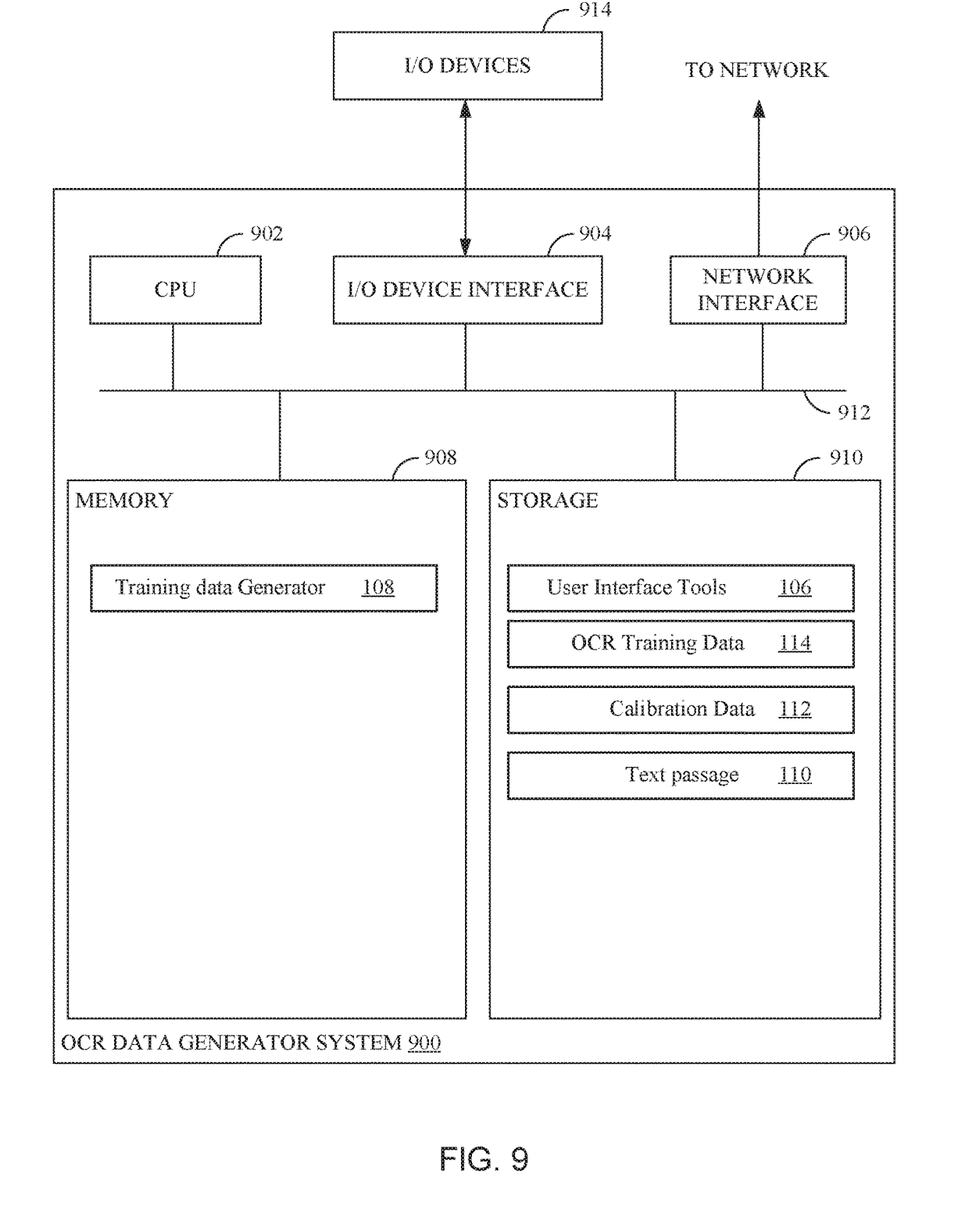
FIG. 9 illustrates an OCR data generator system that generates training data for OCR, according to an embodiment.

FIG. 9 illustrates an OCR data generator system 900 that generates training data for OCR, according to an embodiment. As shown, the OCR data generator system 900 includes, without limitation, a central processing unit (CPU) 902, one or more I/O device interfaces 904 which may allow for the connection of various I/O devices 814 (e.g., keyboards, displays, mouse devices, pen input, etc.) to the OCR data generator system 900, network interface 906, a memory 908, storage 910, and an interconnect 912.

CPU 902 may retrieve and execute programming instructions stored in the memory 908. Similarly, the CPU 902 may retrieve and store application data residing in the memory 908. The interconnect 912 transmits programming instructions and application data among the CPU 902, I/O device interface 904, network interface 906, memory 908, and storage 910. CPU 902 can represent a single CPU, multiple CPUs, a single CPU having multiple processing cores, and the like. Additionally, the memory 906 represents random access memory. Furthermore, the storage 910 may be a disk drive. Although shown as a single unit, the storage 910 may be a combination of fixed or removable storage devices, such as fixed disc drives, removable memory cards or optical storage, network attached storage (NAS), or a storage area-network (SAN).

As shown, storage 910 includes a training data generator 108. As shown, memory 908 includes user interface tools 106, OCR training data 114, calibration data 112, and text passage 110. The user interface tools define a user interface (UI) element class; UI elements are instances of the UI class. The training data generator 108 first generates the calibration data for each character in a set of characters by displaying the character individually in a UI element, capturing an image, and defining bounding box dimensions based on the image size. The bounding box dimensions are associated with the character and with the font type and size in which the character was rendered in UI element.

The training data generator 108 then inserts newline characters into the text passage 110 so that each line of the text passage 110, when rendered in the font type and size, will fit into a UI element without wrapping. The training data generator 108 stores the text passage 110, as modified, as golden text in the OCR training data 114. Next, the training data generator 108 divides the text passage 110 into fragments that can each fit into a multi-line UI element without scrolling when rendered in the font type and size.

The training data generator 108 captures a preliminary image of each fragment as displayed in a multi-line UI element rendered in the font type and font size. The training data generator 108 stitches together a multipage image by concatenating the preliminary images together in sequential order and stores the multipage image with the OCR training data 114.

The training data generator 108 determines a first coordinate and a second coordinate of a bounding box for each character in the multipage image. The training data generator 108 determines the first coordinate for a bounding box for by displaying all characters in the line up to the character, measuring the width of a single-line UI element, and subtracting the width of the bounding box from the width of the single-line UI element. The training data generator 108 determines the second coordinate for the bounding box based on a line number of the line in which the character is found in the golden text. The training data generator 108 stores the bounding box coordinates and indicators of the font type and font size in which the characters were rendered in the OCR training data 114.

As a note, in some languages, text is read vertically (e.g., as in some Chinese or Korean scripts) or from right to left (e.g., as in some Hebrew scripts). While the examples described herein refer to text that is read from left to right, the techniques described can readily be modified for use on text that is read in some other direction without departing from the spirit and scope of the disclosure.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for generating training data for optical character recognition, the method comprising:
   selecting a line of text from a multi-line text fragment;
   selecting a character located in the line of text;
   displaying a character subsequence from the line of text in a single-line user-interface (UI) element, wherein the character subsequence is rendered in a font type and a font size for display in the single-line UI element and wherein the character subsequence includes the character and any characters that precede the character in the line of text;
   determining a width used by single-line UI element to display the character subsequence;
   determining at least a first coordinate and a second coordinate, wherein the first coordinate and the second coordinate define a position of a bounding box for the character in a training image; and
   storing the training image, the multi-line text fragment, an indication of the font type, an indication of the font size, and the first and second coordinates as training data for optical character recognition.

2. The method of claim 1, further comprising:
   displaying the multi-line text fragment in a multi-line user-interface (UI) element, wherein the multi-line text fragment is rendered in the font type and the font size for display in the multi-line UI element, wherein the multi-line text fragment is excerpted from a text passage; and
   capturing a preliminary image of the individual multi-line text fragment as displayed in the multi-line UI element.

3. The method of claim 2, further comprising:
   stitching together the training image by concatenating the preliminary image with images of at least a second multi-line text fragment excerpted from the text passage to form the training image.

4. The method of claim 2, further comprising:
   identifying a width of the multi-line UI element;
   inserting, based on the width of the multi-line UI element, newline characters into the text passage such that each line of text in the text passage can be displayed in the multi-line UI element rendered in the font type and the font size without wrapping; and
   storing the text passage with the training data for optical character recognition.

5. The method of claim 4, further comprising:
   identifying a height of the multi-line UI element; and
   dividing the text passage into a plurality of multi-line fragments based on the height of the multi-line element such that each multi-line fragment can be fully displayed in the multi-line element rendered in the font type and the font size without scrolling.

6. The method of claim 1, further comprising:
   identifying a set of characters for recognition;
   for each respective character in the set of characters;
      displaying the respective character alone in a UI element rendered in the font type and the font size;
      capturing an image of the respective character as displayed in the UI element;
      determining a set of offsets for the respective character based on the image of the respective character, wherein each offset indicates an amount of space between an edge of the image of the respective character and the respective character; and
      storing the set of offsets with the training data for optical character recognition.

7. The method of claim 1, wherein determining the first coordinate and the second coordinate includes:
   determining the first coordinate by subtracting a width of the bounding box from the width used by the single-line UI element; and
   determining the second coordinate based on a line number associated with the line of text.

8. The method of claim 1, further comprising:
   receiving an indication of a set of font types for a batch mode;
   receiving an indication of a set of font sizes for the batch mode;
   selecting the font type from the set of font types; and
   selecting the font size from the set of font sizes.

9. A system, comprising:
   one or more processors; and
   memory storing one or more applications, which, when executed on the one or more processors perform an operation for generating training data for optical character recognition (OCR), the operation comprising:
      selecting a line of text from a multi-line text fragment;
      selecting a character located in the line of text;
      displaying a character subsequence from the line of text in a single-line user-interface (UI) element, wherein the character subsequence is rendered in a font type and a font size for display in the single-line UI element and wherein the character subsequence includes the character and any characters that precede the character in the line of text;
      determining a width used by single-line UI element to display the character subsequence;
      determining at least a first coordinate and a second coordinate, wherein the first coordinate and the second coordinate define a position of a bounding box for the character in a training image; and
      storing the training image, the multi-line text fragment, an indication of the font type, an indication of the font size, and the first and second coordinates as training data for optical character recognition.

10. The system of claim 9, wherein the operation further comprises:

displaying the multi-line text fragment in a multi-line user-interface (UI) element, wherein the multi-line text fragment is rendered in the font type and the font size for display in the multi-line UI element, wherein the multi-line text fragment is excerpted from a text passage; and capturing a preliminary image of the individual multi-line text fragment as displayed in the multi-line UI element.

11. The system of claim 10, wherein the operation further comprises:

stitching together the training image by concatenating the preliminary image with images of at least a second multi-line text fragment excerpted from the text passage to form the training image.

12. The system of claim 10, wherein the operation further comprises:

identifying a width of the multi-line UI element;

inserting, based on the width of the multi-line UI element, newline characters into the text passage such that each line of text in the text passage can be displayed in the multi-line UI element rendered in the font type and the font size without wrapping; and storing the text passage with the training data for optical character recognition.

13. The system of claim 12, wherein the operation further comprises:

identifying a height of the multi-line UI element; and dividing the text passage into a plurality of multi-line fragments based on the height of the multi-line element such that each multi-line fragment can be fully displayed in the multi-line element rendered in the font type and the font size without scrolling.

14. The system of claim 9, wherein the operation further comprises:

identifying a set of characters for recognition;

for each respective character in the set of characters;

displaying the respective character alone in a UI element rendered in the font type and the font size;

capturing an image of the respective character as displayed in the UI element;

determining a set of offsets for the respective character based on the image of the respective character, wherein each offset indicates an amount of space between an edge of the image of the respective character and the respective character; and storing the set of offsets with the training data for optical character recognition.

15. The system of claim 9, wherein the operation further comprises:

determining the first coordinate by subtracting a width of the bounding box from the width used by the single-line UI element; and determining the second coordinate based on a line number associated with the line of text.

16. The system of claim 9, wherein the operation further comprises:

receiving an indication of a set of font types for a batch mode;

receiving an indication of a set of font sizes for the batch mode;

selecting the font type from the set of font types; and selecting the font size from the set of font sizes.

17. A non-transitory computer-readable storage medium containing instructions that, when executed by one or more processors, perform an operation for generating training data for optical character recognition (OCR), the operation comprising:

selecting a line of text from a multi-line text fragment;

selecting a character located in the line of text;

displaying a character subsequence from the line of text in a single-line user-interface (UI) element, wherein the character subsequence is rendered in a font type and a font size for display in the single-line UI element and wherein the character subsequence includes the character and any characters that precede the character in the line of text;

determining a width used by single-line UI element to display the character subsequence;

determining at least a first coordinate and a second coordinate, wherein the first coordinate and the second coordinate define a position of a bounding box for the character in a training image; and storing the training image, the multi-line text fragment, an indication of the font type, an indication of the font size, and the first and second coordinates as training data for optical character recognition.

18. The computer-readable storage medium of claim 17, wherein the operation further comprises:

displaying the multi-line text fragment in a multi-line user-interface (UI) element, wherein the multi-line text fragment is rendered in the font type and the font size for display in the multi-line UI element, wherein the multi-line text fragment is excerpted from a text passage; and capturing a preliminary image of the individual multi-line text fragment as displayed in the multi-line UI element.

19. The computer-readable storage medium of claim 18, wherein the operation further comprises:

stitching together the training image by concatenating the preliminary image with images of at least a second multi-line text fragment excerpted from the text passage to form the training image.

20. The computer-readable storage medium of claim 18, wherein the operation further comprises:

identifying a width of the multi-line UI element;

inserting, based on the width of the multi-line UI element, newline characters into the text passage such that each line of text in the text passage can be displayed in the multi-line UI element rendered in the font type and the font size without wrapping; and storing the text passage with the training data for optical character recognition.

21. The computer-readable storage medium of claim 20, wherein the operation further comprises:

identifying a height of the multi-line UI element; and dividing the text passage into a plurality of multi-line fragments based on the height of the multi-line element such that each multi-line fragment can be fully displayed in the multi-line element rendered in the font type and the font size without scrolling.

22. The computer-readable storage medium of claim 17, wherein the operation further comprises:

identifying a set of characters for recognition;

for each respective character in the set of characters;

displaying the respective character alone in a UI element rendered in the font type and the font size;

capturing an image of the respective character as displayed in the UI element;

determining a set of offsets for the respective character based on the image of the respective character, wherein each offset indicates an amount of space between an edge of the image of the respective character and the respective character; and storing the set of offsets with the training data for optical character recognition.

23. The computer-readable storage medium of claim 17, wherein the operation further comprises:
   determining the first coordinate by subtracting a width of the bounding box from the width used by the single-line UI element; and
   determining the second coordinate based on a line number associated with the line of text.

* * * * *